(12) United States Patent
Fritsch et al.

(10) Patent No.: US 9,102,254 B2
(45) Date of Patent: Aug. 11, 2015

(54) METHOD FOR PRODUCING HEAD RESTRAINTS FOR VEHICLE SEATS AND ONE SUCH HEAD RESTRAINT

(75) Inventors: Christophe Fritsch, Souffelweyersheim (FR); Eugenie Geisinger, Drulingen (FR); Michele Plozner, Kertzfeld (FR)

(73) Assignee: Johnson Controls Technology Company, Holland, MI (US)

( * ) Notice: Subject to any disclaimer, the term of this patent is extended or adjusted under 35 U.S.C. 154(b) by 11 days.

(21) Appl. No.: 13/816,235

(22) PCT Filed: May 3, 2011

(86) PCT No.: PCT/EP2011/057036
§ 371 (c)(1),
(2), (4) Date: Apr. 24, 2013

(87) PCT Pub. No.: WO2012/019791
PCT Pub. Date: Feb. 16, 2012

(65) Prior Publication Data
US 2013/0200679 A1 Aug. 8, 2013

(30) Foreign Application Priority Data
Aug. 13, 2010 (DE) .......................... 10 2010 034 274

(51) Int. Cl.
*A47C 1/10* (2006.01)
*B60N 2/48* (2006.01)
*B60N 2/58* (2006.01)

(52) U.S. Cl.
CPC ................ *B60N 2/48* (2013.01); *B60N 2/5883* (2013.01)

(58) Field of Classification Search
CPC ............................... B60N 2/48; B60N 2/5883
USPC .......... 297/391, 220, 452.58, 452.61, 452.62, 297/463.1, 463.2
See application file for complete search history.

(56) References Cited

U.S. PATENT DOCUMENTS 4,848,836 A * 7/1989 Masui ........................... 297/220
5,405,190 A * 4/1995 Jeffcoat et al. ................ 297/391

(Continued)

FOREIGN PATENT DOCUMENTS

DE 3736828 A1 5/1989
DE 102005015292 B3 11/2006

(Continued)

OTHER PUBLICATIONS

Japanese Office Action dated Mar. 17, 2014.

(Continued)

*Primary Examiner* — Laurie Cranmer
(74) *Attorney, Agent, or Firm* — Fletcher Yoder, P.C.

(57) ABSTRACT

The invention relates to a head restraint for a vehicle seat having a head restraint body and at least one support element, wherein a covering is provided at least in sections on the outside of the head restraint body, which forms a surface of the head restraint. According to the invention, the cover is formed from at least one front section and one rear section which can be coupled to each other in a balloon or bag-like manner by means of at least one connecting seam, wherein a profile element is incorporated in the at least one connecting seam at least in sections in a force-fit and/or form-fit manner, forming a recess, protrusion and/or edge on the surface of the head restraint. The invention further relates to a method for producing a head restraint.

9 Claims, 3 Drawing Sheets

(56) References Cited

U.S. PATENT DOCUMENTS

Figure 1:
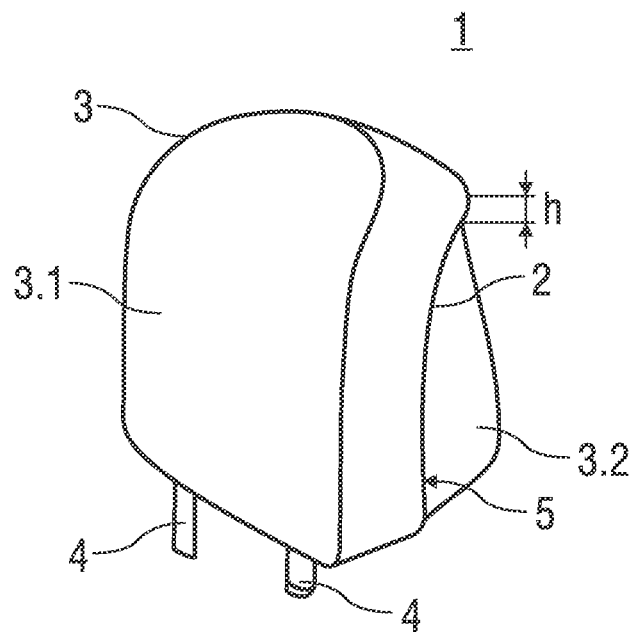

| | | | |
|---|---|---|---|
| 5,664,840 A * | 9/1997 | Stenzel | 297/391 |
| 5,984,414 A * | 11/1999 | Adachi et al. | 297/391 |
| 6,857,699 B2 * | 2/2005 | Ashton et al. | 297/220 |
| 7,338,129 B2 * | 3/2008 | Tabata et al. | 297/391 |

FOREIGN PATENT DOCUMENTS

| | | |
|---|---|---|
| JP | S58072428 A | 4/1983 |
| JP | H0288569 U | 7/1990 |
| JP | H05301236 A | 11/1993 |
| JP | H070328248 A | 12/1995 |
| JP | H08266756 A | 10/1996 |
| JP | 2007307037 A | 11/2007 |
| WO | 2006103242 A1 | 10/2006 |

OTHER PUBLICATIONS

International Search Report for application No. PCT/EP2011/057036 mailed Jul. 19, 2011.

* cited by examiner

METHOD FOR PRODUCING HEAD RESTRAINTS FOR VEHICLE SEATS AND ONE SUCH HEAD RESTRAINT

CROSS REFERENCE TO RELATED APPLICATIONS

This application claims priority from and the benefit of PCT Application No. PCT/EP2011/057036, filed on May 3, 2011; and German Patent DE 10 2010 034 274.2, filed on Aug. 13, 2010; both entitled "Method for Producing Head Restraints for Vehicle seats and One Such Head Restraint", which are herein incorporated by reference.

BACKGROUND

The invention relates to a head restraint for a vehicle seat according to the preamble of claim 1. The invention further relates to a method for producing a head restraint according to the preamble of claim 5.

The production of head restraints from a foamed plastics material is known from the prior art, wherein a material forming the surface of the head restraint, for example leather or fabric, is introduced into a mold and then foamed with the liquid plastics material. The plastics material then cures in the mold.

DE 10 2005 015 292 B3 discloses a head restraint for a vehicle, a method for producing a head restraint and a vehicle seat comprising a head restraint, wherein the head restraint has a head restraint body and a head restraint holding element, wherein a filling material is provided between a connection part and a cover, and wherein the connection part and the cover define a substantially sealed space relative to the filling material in its processing state.

SUMMARY

It is the object of the present invention to specify an improved head restraint for a vehicle seat relative to the prior art and an improved, in particular more efficient, method for producing head restraints for vehicle seats, relative to the prior art, with which shoulders, projections and/or edges may be incorporated in the surface of the head restraint.

With regard to the head restraint for a vehicle seat, the object is achieved by the features set forth in claim 1. With regard to the method for producing a head restraint, the object is achieved by the features set forth in claim 5.

Advantageous developments of the invention form the subject matter of the subclaims.

In the head restraint for a vehicle seat having a head restraint body and at least one retaining element, wherein a cover is provided at least partially on the outer face of the head restraint body, said cover forming a surface of the head restraint, according to the invention the cover is formed from at least one front portion and one rear portion, which may be coupled together in the manner of a balloon or bag by means of at least one connecting seam, wherein a profile element is incorporated non-positively and/or positively into the at least one connecting seam, forming a peripheral edge in the manner of a shoulder or projection on the surface of the head restraint. As a result, the production of head restraints in a conventional foaming method is permitted, said head restraints having shoulders, projections and/or edges in the surface.

In this case, a connecting part for connecting the at least one retaining element to the head restraint body is provided inside the head restraint body, wherein a filling material, in particular a foam, is arranged between the connecting part and the cover, wherein the filling material is provided to be substantially liquid in its processing state, and the cover forms in its interior a sealed cavity relative to the filling material in the processing state.

The profile element is preferably configured to be at least partially flexible. As a result, the profile element is advantageously able to be adapted to a contour of the head restraint.

Advantageously, the shoulders, projections and/or edges may be arranged both in planar and on curved or rounded surface regions of the head restraint.

Particularly preferably, the profile element has a rectangular cross section and is produced from a plastics material or a plastics mixture. In this case, the profile element is formed entirely or almost entirely circumferential around the head restraint.

In a first method step, the front portion and the rear portion of the cover are placed on top of one another with their outer faces and stitched together by means of a first seam.

In a second method step, the profile element is placed with its lower face on the first seam, such that a rear face of the profile element terminates flush or almost flush with an end region of the two portions of the cover stitched together, wherein the profile element is stitched by means of a second seam to the portions stitched together, wherein said second seam extends in the region of a front face of the profile element.

In a third method step, a free end of the front portion is guided around the front face and an upper face of the profile element and is stitched by a third seam, wherein said third seam extends through the end region, the profile element and the front portion of the cover, and the third seam is arranged in the region of a rear face of the profile element. The seams are in this case arranged such that a twisting of the profile element is reliably prevented, even with subsequent foaming of the cover with plastics material.

In a fourth method step, the cover is introduced into a mold and foamed with a liquid plastics material or a plastics mixture, wherein a groove corresponding to the connecting seam and the profile element of the cover is formed in the mold. The insertion of the cover into the mold, in which the cover is foamed, is simplified by the profile element stitched in the cover of the head restraint. The edge formed by the stitched profile element in the cover corresponds to a shoulder or a groove in the mold, whereby the entire cover of the head restraint is fixed securely in the mold during the time period between the insertion and the foaming process.

In a fifth method step, a foam is formed by the solidified plastics material or the solidified plastics mixture in the interior of the cover, said foam entirely or almost entirely filling the inside of the cover.

For producing the head restraint according to the invention with the shoulder, the edge or the projection, in a particularly advantageous manner no additional operating step is required.

Particularly advantageously, the present invention permits a large number of different designs and shapes during the production of head restraints.

DRAWINGS

Figure 2:
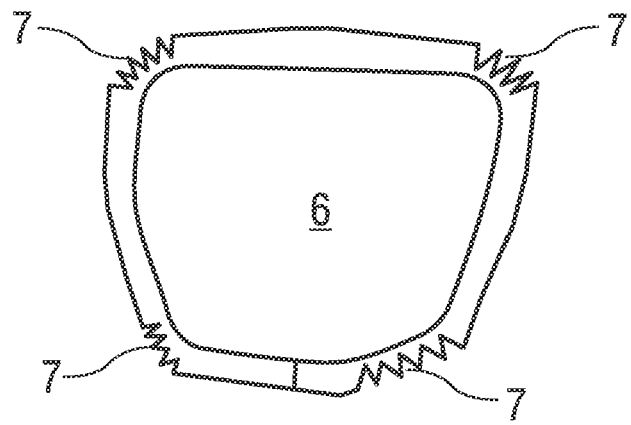
Figure 3:
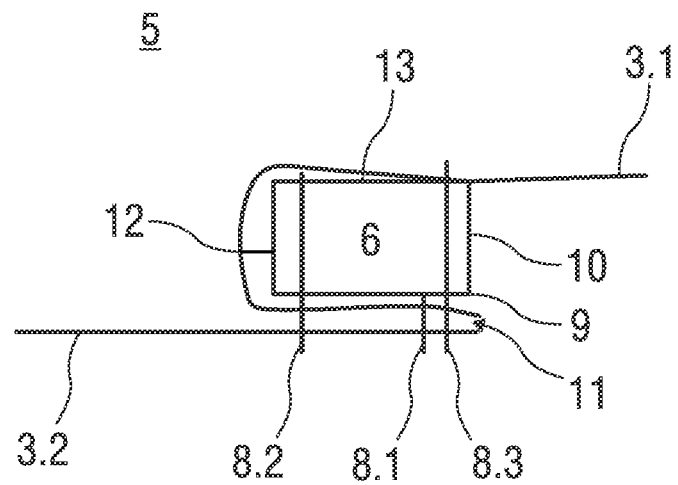
Figure 4:
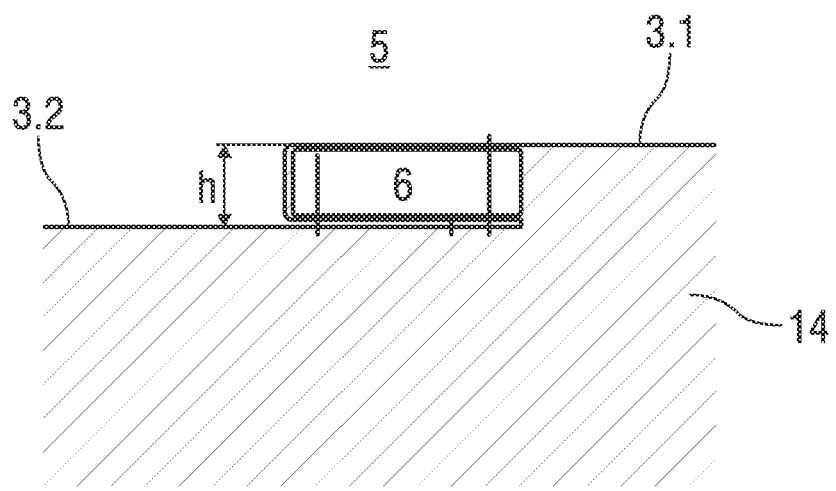
Figure 5:
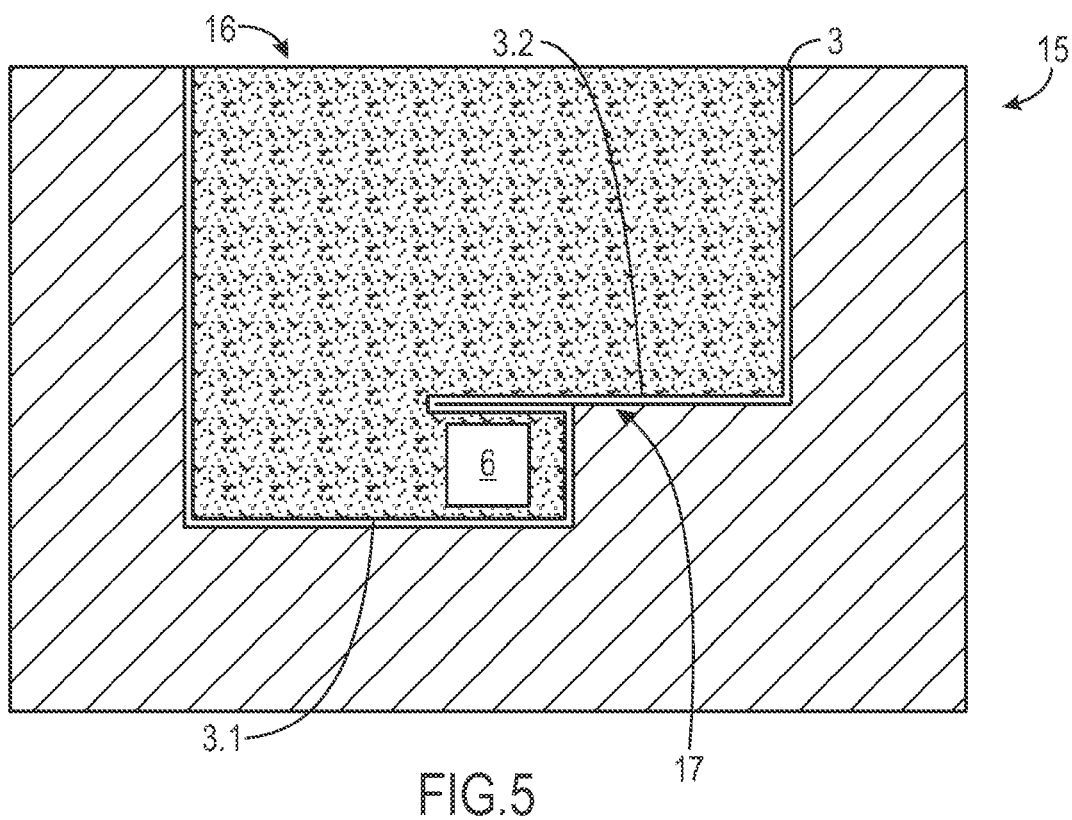

With reference to the accompanying schematic figures, the invention is described in more detail, in which:

FIG. 1 shows schematically a head restraint produced by the method according to the invention with a peripheral edge in a perspective view, FIG. 2 shows schematically a profile element, FIG. 3 shows schematically a sectional view of a connecting seam and the profile element stitched into a cover, FIG. 4 shows schematically a sectional view of a profile element in a foamed cover, and FIG. 5 is a schematic cross-sectional view of a mold for forming the head restraint of FIG. 1.

DETAILED DESCRIPTION

Parts which correspond to one another are provided in all the figures with the same reference numerals.

In FIG. 1, a head restraint 1 produced by the method according to the invention is shown schematically with a peripheral edge 2 in a perspective view.

Such a head restraint 1 comprises a cover 3 which forms the surface of the head restraint 1. The cover 3 is formed from at least one front portion 3.1 and one rear portion 3.2.

The cover 3 consists, for example, of a fabric or leather.

On a lower face of the head restraint 1, at least one retaining element 4 is arranged, by means of which the head restraint 1 is fastened to a vehicle seat, not shown, in a manner in which it may be adjusted in height and/or inclination.

In the method for producing the head restraint 1, the cover 3 consisting of the front portion 3.1 and the rear portion 3.2 is stitched together in the manner of a balloon or bag, such that a cavity is formed in an interior of the cover 3.

Subsequently, the cover 3 is introduced in the conventional manner into a mold, not shown, and foamed with a liquid plastics material or a plastics mixture. Said plastics material or plastics mixture then cures in the mold to form a foam 14 shown in FIG. 4. Then the head restraint 1 is removed from the mold.

By means of said foaming, it is not usually possible to produce edges 2 on or at the surface of the head restraint 1, wherein the edges 2 may also be formed as a shoulder or projection.

In order to produce such an edge 2 which is sharply defined by the surrounding surface of the head restraint 1, by means of the conventional foaming method, a profile element 6 is incorporated in the cover 3 on or in a connecting seam 5 between the front portion 3.1 and the rear portion 3.2.

A groove (not shown in more detail) corresponding to the connecting seam 5 and the profile element 6 is formed in the mold in which the cover 3 is introduced for foaming.

Such a profile element 6 is shown schematically in FIG. 2. The profile element 6 is preferably formed from plastics material and is at least partially flexible.

In order to produce or to assist this partial flexibility, the profile element 6 is provided on the outer faces of its curved portions with a plurality of indentations 7 arranged adjacent to one another.

The profile element 6 has a rectangular cross section.

The edge 2 preferably has a height h corresponding to a thickness of the profile element 6 ranging from 5 to 8 mm.

A sectional view is shown schematically in FIG. 3 of the connecting seam 5 and the profile element 6 stitched into the cover 3.

The connecting seam 5 is preferably formed from three individual seams 8.1 to 8.3.

In a first method step, the front portion 3.1 and the rear portion 3.2 are placed on top of one another with their outer faces and stitched together by means of a first seam 8.1.

In a second method step, the profile element 6 is placed with its lower face 9 onto the first seam 8.1, such that a rear face 10 of the profile element 6 terminates flush or almost flush with the end region 11 of the two portions 3.1 and 3.2 stitched together.

Subsequently, the profile element 6 is stitched with the portions 3.1 and 3.2 stitched together by means of a second seam 8.2, wherein said second seam 8.2 extends in the region of a front face 12 of the profile element 6.

In a third method step, the free end of the front portion 3.1 is guided around the front face 12 and an upper face 13 of the profile element 6, and stitched by a third seam 8.3. Said third seam 8.3 extends through the end region 11, the profile element 6 and the front portion 3.1 of the cover 3. The third seam 8.3 is arranged in the region of the rear face 10 of the profile element 6.

In a fourth method step, the cover 3 is introduced into the mold 15 and foamed with a liquid plastics material 16 or a plastics mixture, wherein a groove 17 corresponding to the connecting seam 5 and the profile element 6 of the cover 3 is formed in the mold 15, as shown in FIG. 5.

By means of the three seams 8.1 to 8.3, the cover 3 is sealed in the region of the connecting seam 5 such that when filling the liquid plastics material into the interior of the cover 3, no plastics material flows through the seams 8.1 to 8.3 onto the outer face of the cover 3.

In a fifth method step, a foam 14 is formed from the solidified plastics material or the solidified plastics mixture in the interior of the cover 3, said foam entirely or almost entirely filling the interior of the cover 3.

In FIG. 4, a sectional view of the profile element 6 is shown schematically in a foamed cover 3.

The invention claimed is:

1. A head restraint for a vehicle seat comprising a head restraint body and at least one retaining element, wherein a cover is provided at least partially on an outer face of the head restraint body, the cover forming a surface of the head restraint, and wherein the cover is formed from at least one front portion and one rear portion, which are configured to be coupled together in the manner of a balloon or bag by at least one connecting seam, and wherein the head restraint comprises a profile element having a plurality of indentations arranged on an outer face of the profile element to facilitate flexibility of the profile element, and the profile element is incorporated at least partially into the at least one connecting seam, forming a shoulder, projection and/or an edge on the surface of the head restraint.

2. The head restraint as claimed in claim 1, wherein the profile element has a rectangular cross section.

3. The head restraint as claimed in claim 1, wherein the profile element is produced from a plastics material or a plastics mixture.

4. The head restraint as claimed in claim 1, wherein the profile element is formed entirely or almost entirely circumferential around the head restraint.

5. A method for producing the head restraint as claimed in claim 1, wherein in a first method step, the at least one front portion and the one rear portion of the cover are placed on top of one another and stitched together by a first connecting seam of the at least one connecting seam.

6. The method as claimed in claim 5, wherein in a second method step, the profile element is placed with its lower face on the first connecting seam, such that a rear face of the profile element terminates flush or almost flush with an end region of the two portions of the cover stitched together, the profile element is stitched by a second connecting seam of the at least one connecting seam to the portions stitched together, and the second connecting seam extends in the region of a front face of the profile element.

7. The method as claimed in claim 6, wherein in a third method step, a free end of the at least one front portion is guided around the front face and an upper face of the profile element and is stitched by a third connecting seam of the at least one connecting seam, and wherein the third connecting seam extends through the end region, the profile element and the at least one front portion of the cover and the third seam is arranged in a region of the rear face of the profile element.

8. The method as claimed in claim 7, wherein in a fourth method step, the cover is introduced into a mold and foamed with a liquid plastics material or a plastics mixture, wherein a groove corresponding to the at least one connecting seam and the profile element of the cover is formed in the mold.

9. The method as claimed in claim 8, wherein in a fifth method step, a foam is formed by the solidified plastics material or the solidified plastics mixture in an interior of the cover, the foam entirely or almost entirely filling the interior of the cover.

* * * * *